(12) United States Patent
DeNoia et al.

(10) Patent No.: US 11,148,391 B2
(45) Date of Patent: Oct. 19, 2021

(54) ABRASIVE WIPE

(71) Applicant: FIRST QUALITY NONWOVENS, INC., Great Neck, NY (US)

(72) Inventors: Paul DeNoia, Anderson, SC (US); Karthik Ramaratnam, Anderson, SC (US); Michael Kauschke, Prien (DE); Peter Zajaczkowski, Greenville, SC (US)

(73) Assignee: PFNONWOVENS LLC, Hazelton, PA (US)

( * ) Notice: Subject to any disclaimer, the term of this patent is extended or adjusted under 35 U.S.C. 154(b) by 416 days.

(21) Appl. No.: 15/899,623

(22) Filed: Feb. 20, 2018

(65) Prior Publication Data

US 2018/0236747 A1    Aug. 23, 2018

Related U.S. Application Data

(60) Provisional application No. 62/460,234, filed on Feb. 17, 2017.

(51) Int. Cl.
*B32B 5/26* (2006.01)
*B32B 5/12* (2006.01)
*D04H 1/56* (2006.01)
*D04H 3/14* (2012.01)
(Continued)

(52) U.S. Cl.
CPC ............... *B32B 5/26* (2013.01); *A47L 13/16* (2013.01); *B32B 5/12* (2013.01); *D04H 1/559* (2013.01); *D04H 1/56* (2013.01); *D04H 3/14* (2013.01); *B32B 2262/0253* (2013.01); *B32B 2307/54* (2013.01); *B32B 2307/726* (2013.01); *B32B 2432/00* (2013.01)

(58) Field of Classification Search
CPC ..... B32B 5/26; B32B 5/12; B32B 2262/0253; B32B 2307/54; B32B 2307/726; B32B 2432/00; A47L 13/16; D04H 1/559; D04H 1/56; D04H 3/14
See application file for complete search history.

(56) References Cited

U.S. PATENT DOCUMENTS

| | | | |
|---|---|---|---|
| 4,196,245 A * | 4/1980 | Kitson | A41D 13/1209 428/198 |
| 4,374,888 A * | 2/1983 | Bornslaeger | B32B 5/26 428/198 |
| 4,436,780 A | 3/1984 | Hotchkiss et al. | |

(Continued)

OTHER PUBLICATIONS

International Search Report and Written Opinion of PCT/US2018/018688 dated Apr. 19, 2018.
(Continued)

*Primary Examiner* — Dung Van Nguyen
(74) *Attorney, Agent, or Firm* — Amster, Rothstein & Ebenstein LLP

(57) ABSTRACT

An abrasive wipe includes a spunbond layer that forms a first outer surface of the wipe, a meltblown layer positioned over the spunbond layer so as to form an inner layer of the wipe and an abrasive layer positioned over the meltblown layer so as to form a second outer surface of the wipe. The spunbond layer, the meltblown layer and the abrasive layer are bonded together in a single bonding step, and, in an exemplary embodiment, the abrasive wipe has an MD tensile strength of at least 700 g/cm and a CD tensile strength of at least 500 g/cm.

17 Claims, 3 Drawing Sheets

(51) Int. Cl.
    *A47L 13/16*         (2006.01)
    *D04H 1/559*       (2012.01)

(56)                  References Cited

U.S. PATENT DOCUMENTS

| | | |
|---|---|---|
| 4,659,609 A | 4/1987 | Lamers et al. |
| 5,258,220 A | 11/1993 | Joseph |
| 5,589,258 A | 12/1996 | Maddern et al. |
| 8,129,298 B2 | 3/2012 | Motomura et al. |
| 10,682,291 B2 * | 6/2020 | Castillo .................. D04H 13/00 |
| 2005/0042518 A1 * | 2/2005 | Kinn ...................... D04H 1/541 |
| | | 429/250 |
| 2005/0079987 A1 | 4/2005 | Cartwright et al. |
| 2005/0136772 A1 | 6/2005 | Chen et al. |
| 2012/0177888 A1 | 7/2012 | Escafere et al. |
| 2013/0047365 A1 | 2/2013 | Goldwasser |

OTHER PUBLICATIONS

Chinese Search Report dated Nov. 2, 2020 in connection with Chinese Application No. 201880012156.8..
Supplementary European Search Report dated Sep. 16, 2020 in connection with European Application No. 18754539.7.

* cited by examiner

ABRASIVE WIPE

RELATED APPLICATIONS

This application is a non-provisional claiming priority to and the benefit of U.S. Provisional Patent Application No. 62/460,234, entitled Abrasive Wipe and filed Feb. 17, 2017, the contents of which are incorporated herein by reference in their entirety.

FIELD OF THE INVENTION

The present disclosure generally relates to abrasive webs and methods of making such webs.

BACKGROUND

Conventional cleaning wipes are made to hold and disperse cleaning solution, and in some cases include an abrasive side for cleaning up tougher messes. Such wipes are used to clean, for example, a kitchen counter or a stove top, and may be used to scrub grease or oil from human hands. Wipes may contain different cleaning solutions depending on desired application, and should be able to hold the solution until use.

Conventional wipe products, such as the wipe disclosed in U.S. Patent Application Publication U.S. 20030200991A1, tend to be constructed of meltblown fibers. However, wipe products made from a pure meltblown construction do not exhibit sufficient strength or durability. Other known wipe products are not made entirely of meltblown layers. For example, U.S. Pat. No. 6,586,385 discloses a product that includes cellulose and polyester layers. Conventional methods of forming products with this construction employ multi-step processes that require two or more precursor webs that can be bound together by, for example, lamination, hydroentangling, or needle punching. This multi-step process drives up cost of the product.

U.S. Pat. No. 4,659,609 discloses a wipe product formed by applying an abrasive layer to a base layer of meltblown/spunbonded web. In all embodiments disclosed in U.S. Pat. No. 4,659,609, the outer layer of the wipe is a meltblown layer, with a spunbond layer used as a middle layer.

SUMMARY OF THE INVENTION

An object of the present invention is to provide a wipe product that exhibits enhanced strength and durability as compared to conventional wipes through the use of a combination of a spunbond base layer and one or more meltblown layers containing a fine fiber meltblown layer and/or an abrasive meltblown layer.

An abrasive wipe according to an exemplary embodiment of the present invention comprises: a meltblown layer; a spunbond layer positioned over the meltblown layer so as to form a first outer surface of the wipe; and an abrasive layer positioned over the meltblown layer so as to form a second outer surface of the wipe, wherein the spunbond layer, the meltblown layer and the abrasive layer are bonded together in a single bonding step, and the abrasive wipe has an MD tensile strength of at least 700 g/cm and a CD tensile strength of at least 500 g/cm.

According to an exemplary embodiment, the abrasive wipe has an MD elongation of at least 60% and a CD elongation of at least 60%.

According to an exemplary embodiment, the meltblown layer is made up of polypropylene fibers.

According to an exemplary embodiment, the spunbond layer is made up of polypropylene fibers.

According to an exemplary embodiment, the second outer surface of the wipe has a durability value of 5 mg or less.

According to an exemplary embodiment, the first outer surface of the wipe has an durability value of 10 mg or less.

According to an exemplary embodiment, the abrasive wipe has a total durability value of 13 mg or less.

According to an exemplary embodiment, fibers that make up the spunbond layer have a diameter of 10 to 100 microns.

According to an exemplary embodiment, fibers that make up the meltblown layer have a diameter of 10 microns or less.

According to an exemplary embodiment, the spunbond layer makes up 20% to 70% of total weight of the wipe.

According to an exemplary embodiment, the meltblown layer makes up 10% to 80% of total weight of the wipe.

According to an exemplary embodiment, at least one of the spunbond layer and the meltblown layer comprises a melt additive.

According to an exemplary embodiment, the melt additive is a hydrophilic melt additive.

According to an exemplary embodiment, the spunbond layer, the meltblown layer and the abrasive layer are bonded together in a single bonding step by a calender bonding process.

A method of forming an abrasive wipe according to an exemplary embodiment of the present invention comprises: forming a spunbond layer that defines a first external surface of the wipe; disposing a meltblown layer over the spunbond layer so as to form an internal layer of the wipe; disposing an abrasive layer over the meltblown layer so as to form a second external surface of the wipe; and bonding the spunbond layer, the meltblown layer and the abrasive layer together in a single bonding step.

According to an exemplary embodiment, the bonding comprises feeding the spunbond layer, the meltblown layer and the abrasive layer through a calender bonding station.

An abrasive wipe according to an exemplary embodiment of the present invention comprises: a spunbond base layer; and one or more meltblown layers disposed over the spunbond base layer, wherein fibers that make up the one or more meltblown layers have a diameter of 10 microns or less.

DETAILED DESCRIPTION

The present invention is directed to a multi-layer wipe product that includes an abrasive layer and a base layer. The base layer is made up of coarse fibers and fine fibers. The abrasive layer and base layers are calender bonded in a single step to reduce production time and cost. The fine fiber layer fills the voids between the layers and provides additional surface area to trap liquids within the wipe.

Figure 1:
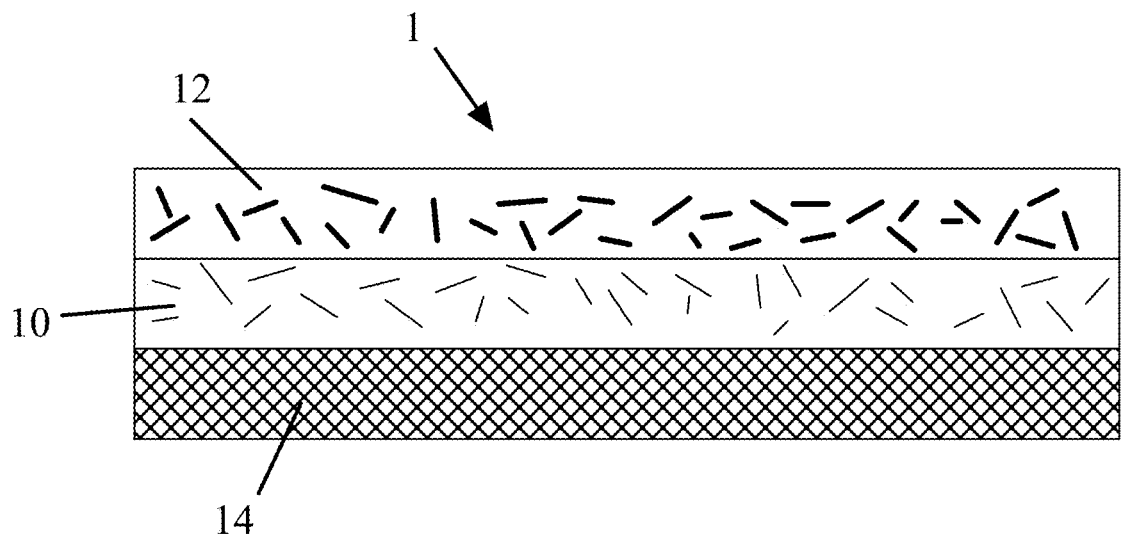
FIG. 1 is a cross-sectional view of an abrasive wipe according to an exemplary embodiment of the present invention.

FIG. 1 is a cross-sectional view of a wipe, generally designated by reference number 1, according to an exemplary embodiment of the present invention. The wipe 1 includes a polypropylene spunbond layer 12, a meltblown layer 10 and an abrasive layer 14. As discussed in further detail below, the layers 10, 12 and 14 are calender bonded in a single process step.

The spunbond layer 12 is formed using, for example, Reicofil spunbond equipment (available from Reifenhauser Reicofil of Troisdorf, Germany) using a conventional process of spinning spunbond nonwoven fibers. In a typical spunbonding process, polymer is melted by heating and mechanical action and conveyed through an extruder. Any resin modifiers, colorants, etc. are introduced at this point. The polymer melt is then passed through a screen to filter out any contaminates before reaching a metering pump which controls the amount of polymer flow. The pump sends the polymer melt through a spin pack which pushes the melt through a spinneret which forms thousands of fibers. After the molten polymer is emitted from the spinneret, the fibers are quenched by cool air while being attenuated down the fiber channel. The attenuation orients the molecular polymer, creating a continuous filament of which the fiber diameter can be modified through the process settings. For this process, the fibers are melt-spun in a closed system using the technique developed by Reifenhauser GmbH. Near the end of the attenuation channel, ambient air is let into the system above a fiber diffuser that is used to randomly orient the fibers to create a web of thermoplastic fibers.

If the overall basis weight of the fabric is approximately 50 gsm or greater, a melt additive may be used (approximately 10% addition rate) to ensure that all layers are properly bonded together by the calender system. The melt additive has a lower melt temperature than the polypropylene spunbond resin, thus decreasing the overall melting point of the spunbond layer 12 in order to facilitate better bonding at the point of calendering. The spunbond polymer also includes a melt additive that renders the extruded fibers hydrophilic. The hydrophilic nature of these fibers helps the final product to absorb and hold cleaning solutions that may be applied or to absorb and hold liquids being cleaned up. The spunbond layer 12 makes up approximately 20% to approximately 70% of the total fabric weight and is made up of relatively coarse fibers 13 having a diameter within the range of 10 to 100 microns. In a preferred embodiment, the spunbond layer 12 makes up approximately 50% of the total fabric weight and is made up of fibers having a diameter within the range of 15 to 25 microns.

The meltblown layer 10 may be formed using, for example, Reifenhauser meltblowing equipment using a conventional meltblowing process, which is similar to the conventional spunbond process described above except that the meltblown fibers are attenuated by air jets exiting directly into the production line instead of in a sealed off cabin. This layer is applied on top of the spunbond layer 12 and also incorporates the same melt additive added to the spunbond layer 12 to render the meltblown fibers hydrophilic. The fine meltblown fibers enhance the opacity and absorbent characteristics of the material. Without being bound by theory, it is believed that the fine web of hydrophilic meltblown fibers helps this layer to trap the liquids it absorbs. This helps to hold any cleaning solutions applied to the material as well as assisting in metering out the cleaning solution in a slower, more controllable manner. The meltblown layer 10 makes up approximately 10% to approximately 80% of the total fabric weight and is made up of relatively fine fibers 11 having a diameter of approximately 10 microns or less. In a preferred embodiment, the meltblown layer 10 makes up approximately 20% to 30% of the total fabric weight.

The abrasive layer 14 is applied using, for example, Reifenhauser meltblowing equipment that is the same equipment used to apply the meltblown layer 10. The abrasive fibers are created by changing the polymer and some of the process settings of this equipment. The resin used for the abrasive layer has a more viscous melt. This is then combined with process settings that do not adequately draw the meltblown fibers as they would normally be drawn, creating fibers that are deposited in a semi-molten state onto the fabric below. Because the fibers are still semi-molten as they are deposited onto the material, the fiber diameters vary, fibers tangle and combine with each other, and they eventually harden into rough, abrasive fibers. Because of the poor drawing conditions, these fibers lay down in a blotchy, speckled pattern. The abrasive fibers may be colored for a visual cue as to which side of the wipe 1 is abrasive, though they do not need to be colored to be abrasive.

In some exemplary embodiments, the wipe 1 may be topically treated with surfactants as surface modifiers, as necessary. Any topical surfactant that is compatible with polypropylene fiber may be used.

Figure 2:
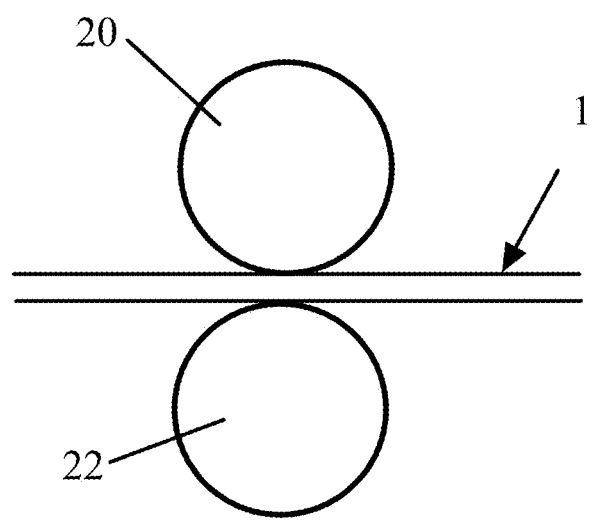
FIG. 2 shows a calender bonding step of a method of forming an abrasive wipe according to an exemplary embodiment of the present invention.

As shown in FIG. 2, the spunbond layer 12, the meltblown layer 10 and the abrasive layer 14 are calendered with a smooth roll 20 and an embossed roll 22, creating a well-bonded fabric. Bonding all layers together in one process creates a stronger, more resilient fabric as compared to conventional full meltblown structures. Forming the fabric in one process also results in enhanced adhesion of the abrasive layer because the abrasive layer is calender bonded to the base fabric rather than depending on the semi-molten state of the abrasive fibers at the time of deposition alone to adhere the abrasive layer to the base layer.

The abrasive fabric could also be treated with a hydroentangling process to provide additional bulk, micro-fibrillation, fiber entanglement, and provide an improvement in absorbency.

The following examples illustrate additional details and advantages of the present invention.

Example 1 (33.9 Gsm Abrasive Wipe)

A spunbond base layer was first laid down using a Reicofil machine. This layer was made with polypropylene resin with a melt flow rate of 35 g/10 min at 230° C. and titanium dioxide as an optical brightener. The addition rate of this optical brightener (Standridge SCC-20790, available from Standridge Color Corporation of Georgia, USA) was 1% of the beam throughput, but this additive was not necessary for the performance of the material. This spunbond layer made up approximately 16.9 gsm of the final product (50%). The mean fiber diameter of the spunbond base layer was measured to be 17.85 microns, with a standard deviation of 0.964.

A fine meltblown layer was then applied using a Reifenhauser meltblowing machine. This layer was comprised of a pure polypropylene meltblown resin with a melt flow rate of 1550 g/10 min at 230° C., and made up approximately 7.3 gsm of the final product (22%). The mean fiber diameter of the meltblown layer was measured to be 2.33 microns, with a standard deviation of 0.710.

Finally, the abrasive layer was applied using a Reifenhauser meltblowing machine. This layer was comprised of polypropylene meltblown resin with a melt flow rate of 500 g/10 min at 230° C., usually with a pigmented melt additive to impart a color to these fibers. In this specific example a magenta colorant made up 3% of the abrasive beam's throughput. The colorant, however, is not responsible for the abrasive properties of the material, and can be changed to suit the needs of the material. The abrasive layer made up approximately 9.6 gsm of the final product (28%). The mean fiber diameter of the abrasive layer was measured to be 18.89 microns, with a standard deviation of 6.000.

The material was then sent through an Andritz-Kuesters calendering system (available from ANDRITZ Misters of Spartanburg, S.C., USA) for bonding. The oil temperatures in the embossing roll and swim roll were set to 150° C., and the nip force of the calender was set to 85 N/mm. At these settings, the material was adequately bonded.

Figure 3:
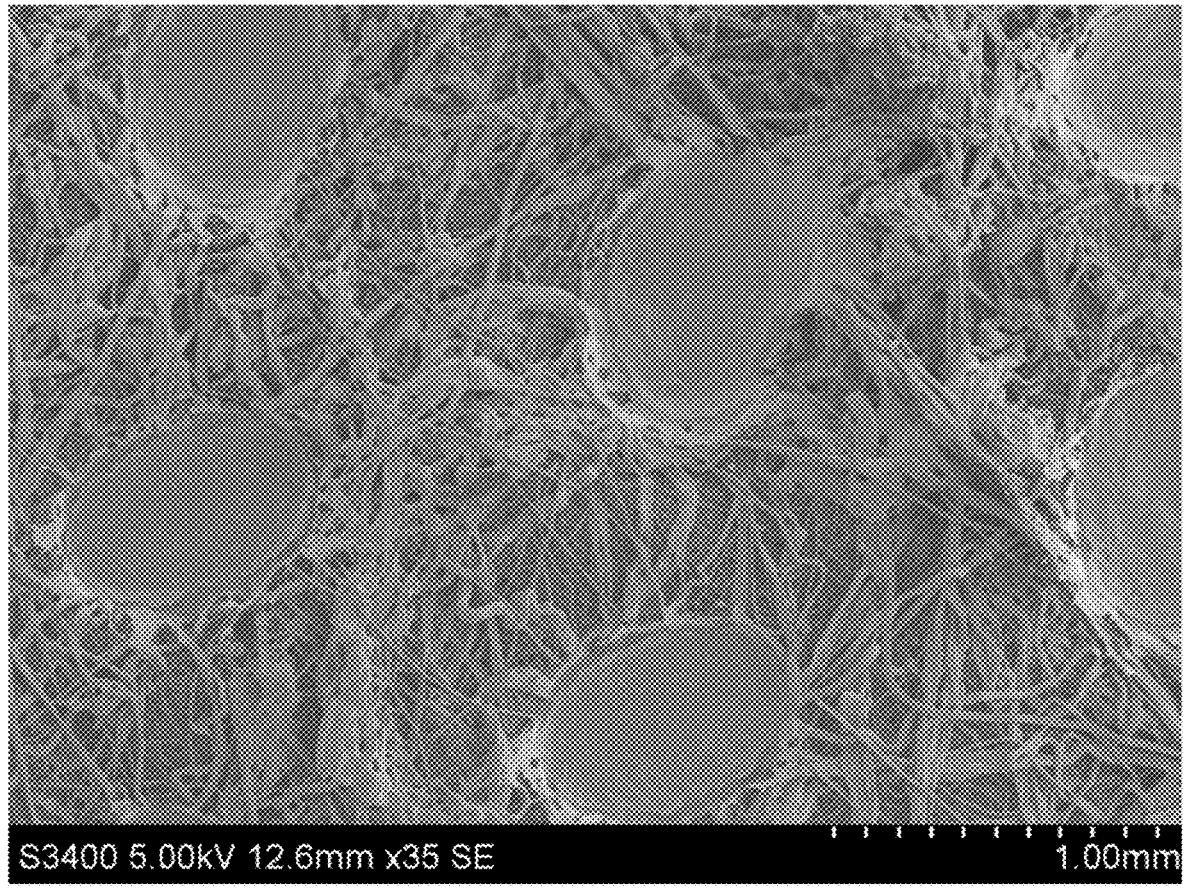
FIG. 3 is a micrograph of an abrasive side of a wipe according to an exemplary embodiment of the present invention.
Figure 4:
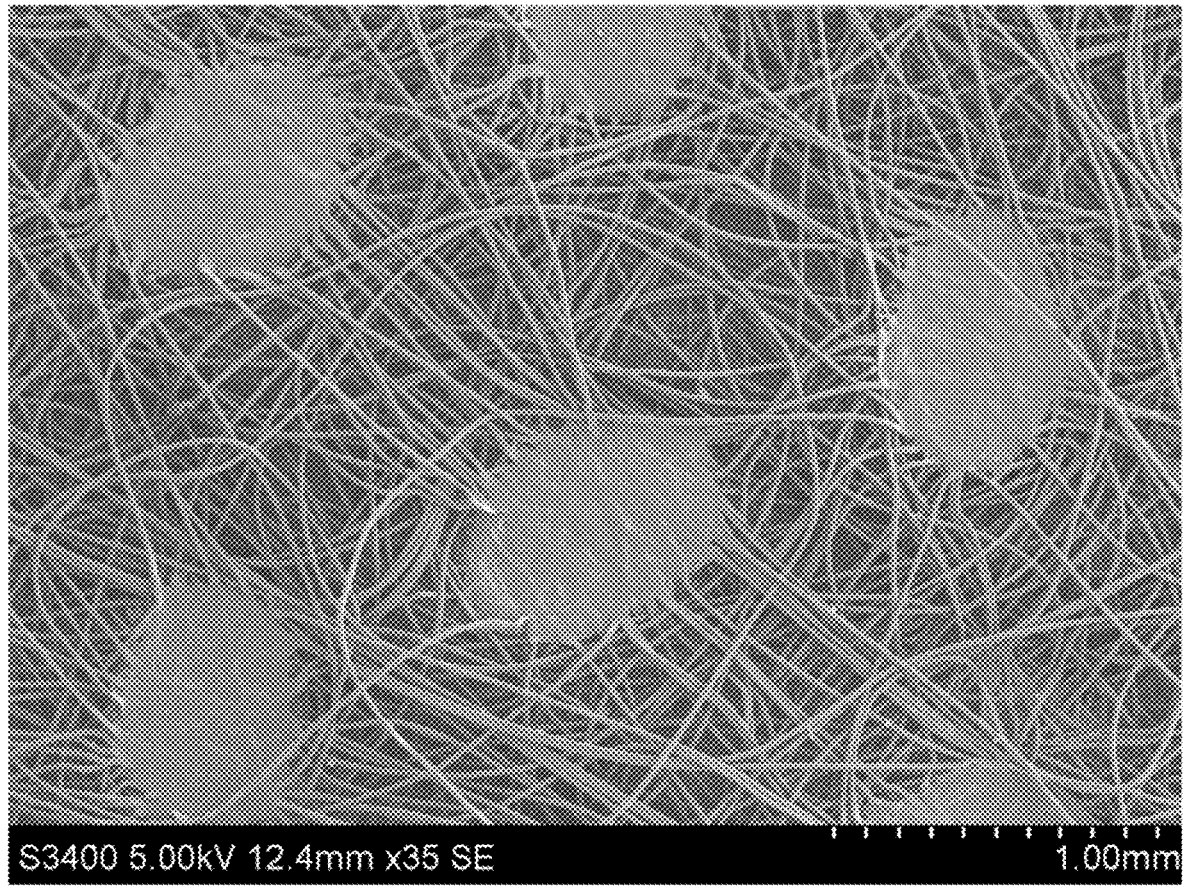
FIG. 4 is a micrograph of a non-abrasive side of a wipe according to an exemplary embodiment of the present invention.

FIG. 3 is a micrograph of a portion of an abrasive side of the wipe of Example 1, and FIG. 4 is a micrograph of a portion of a non-abrasive side (spunbond outer layer) of the wipe of Example 1, Example 2 (50 Gsm Hydrophilic Abrasive Wipe)

A spunbond base layer was first laid down using a Reicofil machine. This layer was made with polypropylene resin with a melt flow rate of 35 g/10 min at 230° C. and titanium dioxide as an optical brightener. In order to impart hydrophilic properties to the material, a masterbatch was also added that rendered the fibers hydrophilic (Techmer Tecshurf® 15560, available from Techmer PM of Clinton, Tenn., USA), and this additive made up 3% of the beam's throughput. The addition rate of the optical brightener (Standridge SCC-20790) was 1% of the beam throughput, but this additive was not necessary for the performance of the material. Due to the weight of this product, another additive was used in order to bond all of the layers together. This additive (ExxonMobil Vistamaxx™ 7020BF, available from Exxon Mobile Corporation) was a propylene and ethylene copolymer with a melt flow rate of 20 g/10 min and made up 10% of the beam's throughput. The copolymer additive with its lower melting point helped to lower the melting point of the spunbond layer, thereby making the calender bonding more effective. This spunbond layer made up approximately 25 gsm of the final product (50%). The mean fiber diameter of the spunbond base layer was measured to be 18.87 microns, with a standard deviation of 1.359.

A fine meltblown layer was then applied using a Reifenhauser meltblowing machine. This layer was comprised of a polypropylene meltblown resin with a melt flow rate of 1550 g/10 min at 230° C. and 3% of the beam's throughput was the hydrophilic melt additive (Techmer Techsurf® 15560) in order to make these fibers hydrophilic. This layer made up approximately 10.9 gsm of the final product (22%). The mean fiber diameter of the meltblown layer was measured to be 2.54 microns, with a standard deviation of 0.863.

Finally, an abrasive layer was applied using a Reifenhauser meltblowing machine. This layer was comprised of polypropylene meltblown resin with a melt flow rate of 500 g/10 min at 230° C., usually with a pigmented melt additive to impart a color to these fibers. In this specific example a magenta colorant made up 3% of the abrasive beam's throughput. The colorant, however, was not responsible for the abrasive properties of the material, and can be changed to suit the needs of the material. The abrasive layer made up approximately 14.2 gsm of the final product (28%). The mean fiber diameter of the abrasive layer was measured to be 18.40 microns, with a standard deviation of 6.257.

The material was then sent through an Andritz-Kuesters calendering system for bonding. The oil temperatures in the embossing roll and swim roll were set to 150° C., and the nip force of the calender was set to 90 N/mm. At these settings, the material was adequately bonded.

Example 3 (60 Gsm Hydrophilic Abrasive Wipe)

A spunbond base layer was first laid down using a Reicofil machine. This layer was made with polypropylene resin with a melt flow rate of 35 g/10 min at 230° C. and titanium dioxide as an optical brightener. In order to impart hydrophilic properties to the material, a masterbatch was also added that rendered the fibers hydrophilic (Techmer Techurf® 15560), and this additive made up 3% of the beam's throughput. The addition rate of the optical brightener (Standridge SCC-20790) was 1% of the beam throughput, but this additive was not necessary for the performance of the material. Due to the weight of this product, another additive was used in order to bond all of the layers together. This additive (ExxonMobil Vistamaxx™ 7020BF) was a propylene and ethylene copolymer with a melt flow rate of 20 g/10 min and made up 10% of the beam's throughput. The copolymer additive with its lower melting point helped to lower the melting point of the spunbond layer, thereby making the calender bonding more effective. This spunbond layer made up approximately 32 gsm of the final product (53%). The mean fiber diameter of the spunbond base layer was measured to be 18.46 microns, with a standard deviation of 1.248.

A fine meltblown layer was then applied using a Reifenhauser meltblowing machine. This layer was comprised of a polypropylene meltblown resin with a melt flow rate of 1550 g/10 min at 230° C. and 3% of the beam's throughput was the hydrophilic melt additive (Techmer Techsurf® 15560) in order to make these fibers hydrophilic. This layer made up approximately 12.3 gsm of the final product (21%). The mean fiber diameter of the meltblown layer was measured to be 1.58 microns, with a standard deviation of 0.808.

Finally, an abrasive layer was applied using a Reifenhauser meltblowing machine. This layer was comprised of polypropylene meltblown resin with a melt flow rate of 500 g/10 min at 230° C., usually with a pigmented melt additive to impart a color to these fibers. In this specific example a magenta colorant made up 3% of the abrasive beam's throughput. The colorant, however, was not responsible for the abrasive properties of the material, and can be changed to suit the needs of the material. The abrasive layer made up approximately 15.9 gsm of the final product (26%). The mean fiber diameter of the abrasive layer was measured to be 20.43 microns, with a standard deviation of 7.357.

The material was then sent through an Andritz-Kuesters calendering system for bonding. The oil temperatures in the embossing roll and swim roll were set to 150° C., and the nip force of the calender was set to 95 N/mm. At these settings, the material was adequately bonded.

Table 1 below compares basic physical properties of Examples 1-3 to other competitive examples:

TABLE 1

| Material | Basis Weight (gsm) | Thickness (μm) | MD Tensile Strength (g/cm) | MD Elongation (%) | CD Tensile Strength (g/cm) | CD Elongation (%) | Absorbency (%) |
|---|---|---|---|---|---|---|---|
| Example 1 | 33.9 | 390 | 550 | 40 | 430 | 50 | 490 |
| Example 2 | 50 | 475 | 890 | 45 | 675 | 50 | 410 |
| Example 3 | 60 | 480 | 1000 | 45 | 800 | 60 | 380 |
| Applicant's Prior MB Abrasive* | 33.9 | 500 | 380 | 30 | 250 | 40 | 575 |
| Gojo Scrubbing Towels | 38 | 440 | 330 | 20 | 240 | 25 | 265 |
| Lysol® Dual-Action | 55 | 500 | 780 | 25 | 200 | 45 | 500 |
| Nice! Dual-Texture | 43 | 300 | 390 | 8 | 130 | 30 | 380 |

*This wipe does not have a spunbond layer but instead has a base layer made of pure meltblown fabric, making up approximately 2/3 of the total fabric weight, with an abrasive layer applied to it making up the other 1/3 of the fabric weight.

As shown in Table 1, the abrasive wipes of Examples 1-3 outperform all of the other comparable wipes in MD and CD tensile strengths and elongations. The absorbency of Examples 1-3 is lower than some competitive wipes, but this can be addressed with topical treatments to the material.

Table 2 below shows some data from Table 1 with the product basis weights linearly normalized to 40 gsm and the physical properties adjusted by the same factors. Absorbency was left off the normalized data since absorbency is affected by more than just the weight of the product.

TABLE 2

| Material (All materials normalized to 40 gsm basis weight) | Thickness (μm) | MD Tensile Strength (g/cm) | MD Elongation (%) | CD Tensile Strength (g/cm) | CD Elongation (%) |
|---|---|---|---|---|---|
| Example 1 | 460 | 650 | 50 | 500 | 60 |
| Applicant's Prior MB Abrasive* | 590 | 450 | 35 | 290 | 50 |
| Gojo Scrubbing Towels | 460 | 350 | 20 | 250 | 30 |
| Lysol® Dual-Action | 370 | 560 | 20 | 150 | 30 |
| Nice! Dual-Texture | 280 | 360 | 10 | 120 | 30 |

Another area of comparison for these wipes is in their resistance to abrasion (i.e., durability). Table 3 shows values of a measure in mg of how much material was rubbed off through 80 cycles of abrasion testing with a Nu-Martindale abrasion tester, following the NWSP 20.5 test methods for Martindale abrasion testing of nonwoven fabrics. This is an adaptation from ASTM D4966 for testing textiles with a Martindale abrasion tester. The basic test method involves weighing the samples before abrasion, running the Nu-Martindale tester for 80 cycles, shaving off the material that has abraded, and then re-weighing the samples to find the amount of material that was abraded. This difference in weight of the samples (averaged from 10 tests of each sample) is the durability value in milligrams listed on the following chart.

TABLE 3

| SAMPLE | Durability Value (Abrasive Side) (mg) | Durability Value (Smooth Side) (mg) | Durability Value (Total Abrasion) (mg) |
|---|---|---|---|
| Applicant's Prior MB Abrasive* | 34.5 | 20.2 | 54.7 |
| Example 1 | 3.8 | 8.3 | 12.1 |
| Example 2 | 0.9 | 5.0 | 5.9 |
| Example 3 | 4.2 | 0.5 | 4.7 |
| Lysol Dual Action Wipes | 10.9 | 0.2 | 11.1 |
| Nice! Dual-Texture Wipes | 1.6 | 11.0 | 12.6 |

As shown in Table 3, the abrasive wipes of Examples 1-3 show less total abrasion, and therefore higher durability, than the competitive examples. This is due to the overall strength and structural stability added by the use of a spunbond base layer and by producing the entire product in one bonding step. For example, the Prior MB Abrasive shows far less durability than Examples 1-3 at the same basis weight because the strength of the overall material in Examples 1-3 is greater with the spunbond base.

The abrasive wipes of Examples 1-3 also show higher durability at the heavier weights than similar products like the Lysol® dual action wipes. This is because the layers of the abrasive wipes of Examples 1-3 are bonded together in one process, whereas the Lysol® wipes are made by applying an abrasive layer to a pre-made base sheet.

Now that the preferred embodiments of the present invention have been shown and described in detail, various modifications and improvements thereon will become readily apparent to those skilled in the art. Accordingly, the spirit and scope of the present invention is to be construed broadly and not limited by the foregoing specification.

The invention claimed is:
1. An abrasive wipe comprising:
   a meltblown layer;
   a spunbond layer positioned over the meltblown layer so as to form a first outer surface of the wipe; and
   a meltblown abrasive layer positioned over the meltblown layer so as to form a second outer surface of the wipe, wherein the spunbond layer, the meltblown layer and the abrasive layer are bonded together in a single bonding step, the abrasive wipe has an MD tensile strength of at least 700 g/cm and a CD tensile strength of at least 500 g/cm, and the abrasive wipe has an MD elongation of at least 60% and a CD elongation of at least 60%, and wherein:

the first outer surface of the wipe has a durability value of 10 mg or less, the second outer surface of the wipe has a durability value of 5 mg or less, and the abrasive wipe has a total durability value of 13 mg or less.

2. The abrasive wipe of claim 1, wherein the meltblown layer is made up of polypropylene fibers.

3. The abrasive wipe of claim 1, wherein the spunbond layer is made up of polypropylene fibers.

4. The abrasive wipe of claim 1, wherein fibers that make up the spunbond layer have a diameter of 10 to 100 microns.

5. The abrasive wipe of claim 1, wherein fibers that make up the meltblown layer have a diameter of 10 microns or less.

6. The abrasive wipe of claim 1, wherein the spunbond layer makes up 20% to 70% of total weight of the wipe.

7. The abrasive wipe of claim 1, wherein the meltblown layer makes up 10% to 80% of total weight of the wipe.

8. The abrasive wipe of claim 1, wherein at lease one of the spunbond layer and the meltblown layer comprises a melt additive.

9. The abrasive wipe of claim 8, wherein the melt additive is a hydrophilic melt additive.

10. The abrasive wipe of claim 1, wherein the spunbond layer, the meltblown layer and the abrasive layer are bonded together in a single bonding step by a calender bonding process.

11. A method of forming an abrasive wipe, comprising:
forming a spunbond layer that defines a first external surface of the wipe;
disposing a meltblown layer over the spunbond layer so as to form an internal layer of the wipe;
disposing meltblown abrasive layer over the meltblown layer so as to form a second external surface of the wipe; and
bonding the spunbond layer, the meltblown layer and the abrasive layer together in a single bonding step, wherein the abrasive wipe has an MD tensile strength of at least 700 g/cm and a CD tensile strength of at least 500 g/cm, and the abrasive wipe has an MD elongation of at least 60% and a CD elongation of at least 60%, and wherein:

the first external surface of the wipe has a durability value of 10 mg or less, the second external surface of the wipe has a durability value of 5 mg or less, and the abrasive wipe has a total durability value of 13 mg or less.

12. The method of claim 11, wherein the bonding comprises feeding the spunbond layer, the meltblown layer and the abrasive layer through a calender bonding station.

13. The method of claim 11, wherein the abrasive layer is produced using a meltblown beam and/or spunbond beam and/or other processes such as spunblown or airlaid or spunlace technologies.

14. The method of claim 11, wherein the spunbond layer is produced with a polymer having a melt flow rate of 10 to 100.

15. The method of claim 11, wherein the meltblown layer is produced with a polymer having a melt flow rate of >1,000.

16. The method of claim 11, wherein the abrasive layer is produced with a polymer having a melt flow rate of 10 to 1,000.

17. An abrasive wipe comprising:
a spunbond base layer;
and two or more meltblown layers disposed over the spunbond base layer, wherein fibers that make up one of the meltblown layers have a diameter of 10 microns or less and the abrasive wipe has an MD elongation of at least 60% and a CD elongation of at least 60%% and wherein:
a first outer surface of the wipe has a durability value of 10 mg or less,
a second outer surface of the wipe has a durability value of 5 mg or less, and
the abrasive wipe has a total durability value of 13 mg or less.

* * * * *